No. 663,961. Patented Dec. 18, 1900.
A. B. DONALDSON.
ARMOR PLATE.
(Application filed May 16, 1900.)
(No Model.)
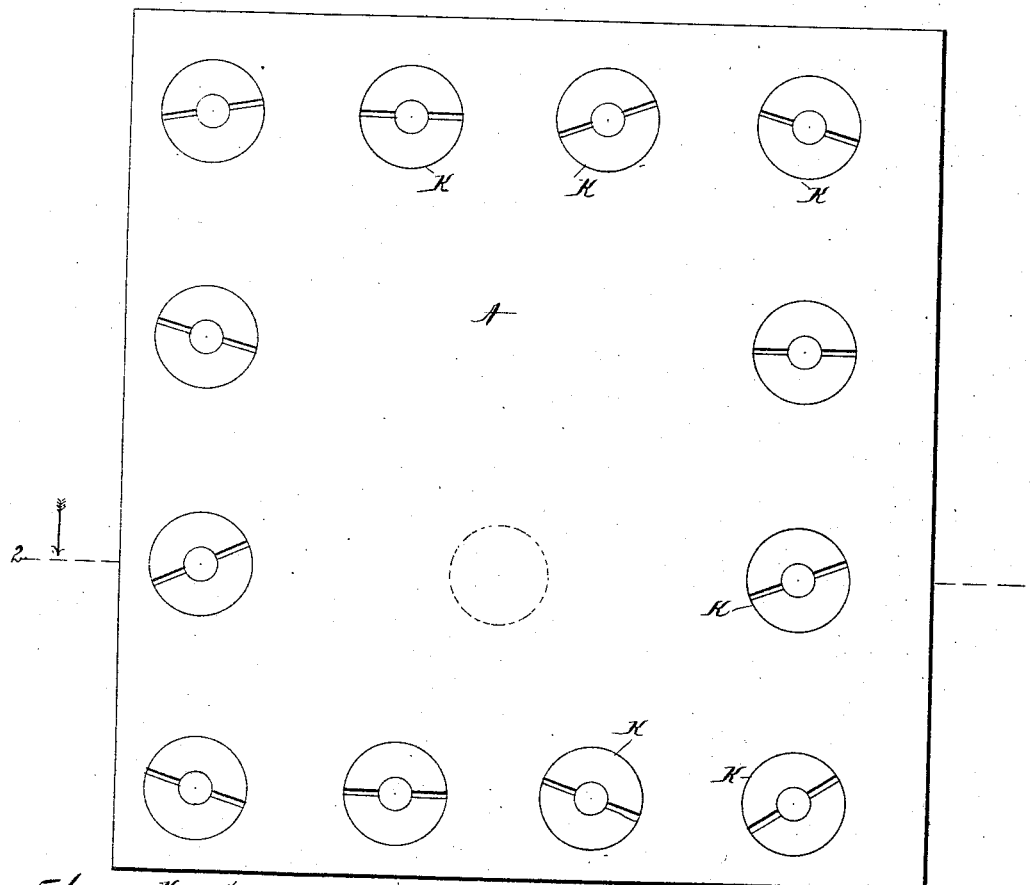
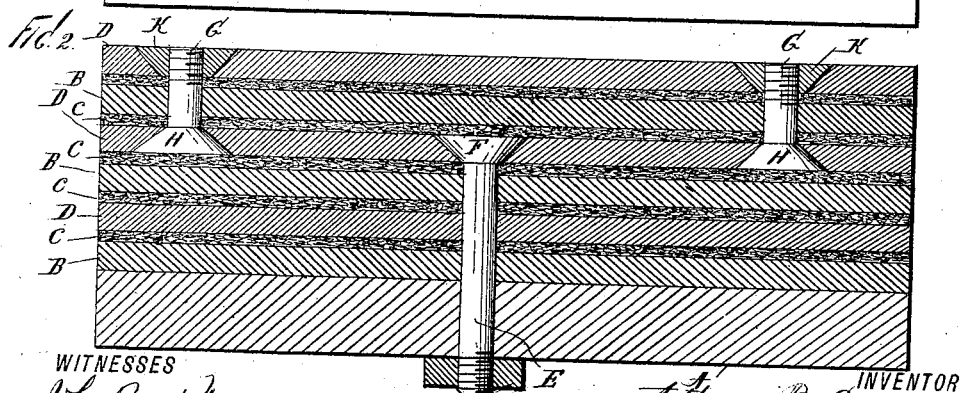
WITNESSES
INVENTOR
Arthur B. Donaldson
BY
Edgar Tate & Co
ATTORNEYS ptd # UNITED STATES PATENT OFFICE.

ARTHUR BURR DONALDSON, OF DUNSEITH, NORTH DAKOTA.

ARMOR-PLATE.

SPECIFICATION forming part of Letters Patent No. 663,961, dated December 18, 1900.

Application filed May 16, 1900. Serial No. 16,853. (No model.)

*To all whom it may concern:*

Be it known that I, ARTHUR BURR DONALDSON, a citizen of the United States, residing at Dunseith, in the county of Rolette and State of North Dakota, have invented certain new and useful Improvements in Armor-Plates, of which the following is a full and complete specification, such as will enable those skilled in the art to which it appertains to make and use the same.

This invention relates to armor-plates for war-ships; and the object thereof is to provide improved armor-plates which may be used as armor for war-ships, deck protection, bomb-proof covers, or on express-cars, and for other and similar purposes.

The invention is fully disclosed in the following specification, of which the accompanying drawings form a part, in which like reference characters denote like parts in both views, and in which—

Figure 1 is a plan view of an armor-plate made according to my invention, and Fig. 2 a transverse section thereof on the line 2 2.

In the drawings forming part of this specification I have shown at A a part of the side wall or frame of a vessel, and in the practice of my invention I provide an armor-plate consisting in the main of alternate layers of rubber or other elastic material and steel, and I also place between the layers of rubber and steel sheets of asbestos to prevent the overheating of the rubber or other elastic material in hot climates, and I have also shown at B, reference being made to Fig. 2, a sheet or plate of rubber or other elastic material, and at C a layer of asbestos, and at D a sheet or plate of steel, and these are alternately arranged. The layers of rubber or other elastic material and steel may be of any desired thickness, and the inner layers are bound to the side of the vessel by bolts E, which are passed inwardly therethrough, and the heads of which are as shown F, and the outer layer or layers are secured to the inner layers by bolts G, the inner ends of which are countersunk in one of the layers of steel, as shown at H, and the outer ends of the bolts G are also provided with countersunk nuts K, by which the outer layer of steel is held in place, and the shanks of the bolts G are preferably angular in cross-section, so as to prevent said bolts from turning in the operation of setting up or riveting the ends thereof, so as to hold the nuts in place. By means of this construction it will be seen that it is impossible for the outer bolts to be driven into the ship by a shot or otherwise, as the heads of said bolts rest on a plate of rubber or on a thin layer of asbestos adjacent to said plate of rubber, and the bolts which hold the inner layers of the armor-plate can also not be driven into the ship by reason of the fact that their heads, which are directed outwardly, are covered by the outer layer or layers of rubber and steel. An armor-plate made in this manner possesses elasticity which deadens the force of a solid shot or shell, and the yielding effect produced counteracts the force of the impact of the shot or shell and decreases its penetrating power.

For the elastic layers or plates I prefer to use rubber; but other material may be found to be suitable, and for the other plates or layers I prefer to use the best quality of nickel, steel, or similar material now employed in the construction of armor-plates.

My improved armor-plate is also much lighter and cheaper, as will be apparent, than armor-plates as usually constructed, and this is an item of great importance in the construction of battle-ships, as by means thereof the coal-carrying capacity and steaming radius may be largely increased.

Having fully described my invention, I claim as new and desire to secure by Letters Patent—

An armor-plate composed of a plurality of layers of steel and elastic material alternately arranged, the inner and outer layers being of steel, all of said layers except the outer layer of steel and the adjacent layer of elastic material being held in place by bolts which pass therethrough inwardly, and the two outer layers of steel and elastic material being held in place by bolts which pass outwardly through the next adjacent inner layer of steel and through said outer layers of steel and elastic material, said bolts being provided with countersunk heads, and the outer bolts being provided with countersunk nuts, substantially as shown and described.

In testimony that I claim the foregoing as my invention I have signed my name, in presence of the subscribing witnesses, this 10th day of May, 1900.

ARTHUR BURR DONALDSON.

Witnesses:
GEORGE A. COURTEAU
A. REEVES.